(12) United States Patent
Zhong et al.

(10) Patent No.: US 12,129,399 B2
(45) Date of Patent: Oct. 29, 2024

(54) FREEZE THAW ADDITIVE COMPOSITION

(71) Applicant: Dow Global Technologies LLC, Midland, MI (US)

(72) Inventors: Ling Zhong, Shanghai (CN); Jing Ji, Shanghai (CN); Cheng Shen, Shanghai (CN); Jianhai Mu, Shanghai (CN)

(73) Assignee: Dow Global Technologies LLC, Midland, MI (US)

(*) Notice: Subject to any disclaimer, the term of this patent is extended or adjusted under 35 U.S.C. 154(b) by 506 days.

(21) Appl. No.: 17/432,408

(22) PCT Filed: Apr. 16, 2019

(86) PCT No.: PCT/CN2019/082904
§ 371 (c)(1),
(2) Date: Aug. 19, 2021

(87) PCT Pub. No.: WO2020/210988
PCT Pub. Date: Oct. 22, 2020

(65) Prior Publication Data
US 2022/0306869 A1   Sep. 29, 2022

(51) Int. Cl.
*C09D 133/08* (2006.01)
*C09D 5/02* (2006.01)

(52) U.S. Cl.
CPC .......... *C09D 5/024* (2013.01); *C09D 133/08* (2013.01)

(58) Field of Classification Search
CPC ........ C09D 5/024; C09D 133/08; C09D 5/02; C09D 5/00
See application file for complete search history.

(56) References Cited

U.S. PATENT DOCUMENTS

| | | | |
|---|---|---|---|
| 6,312,514 B1 | 11/2001 | Schulte et al. | |
| 8,119,717 B2 | 2/2012 | Anchor et al. | |
| 8,993,658 B2 | 3/2015 | Graf et al. | |
| 9,834,698 B2 | 12/2017 | Wu et al. | |
| 2007/0105982 A1* | 5/2007 | Roschmann | C09D 151/003 524/497 |
| 2008/0103237 A1 | 5/2008 | Strepka et al. | |
| 2017/0210895 A1 | 7/2017 | Centner et al. | |
| 2019/0062576 A1 | 2/2019 | Acevedo Velez et al. | |

FOREIGN PATENT DOCUMENTS

| | | | |
|---|---|---|---|
| WO | 2005007203 A1 | 1/2005 | |
| WO | 2013/119521 A1 | 8/2013 | |
| WO | 2014097309 A1 | 6/2014 | |
| WO | 2017/027319 A1 | 2/2017 | |
| WO | 2017/172411 A1 | 10/2017 | |
| WO | 2017/222473 A1 | 12/2017 | |
| WO | WO-2018086055 A1 * | 5/2018 | ............... C08F 2/26 |
| WO | 2019/177920 A1 | 9/2019 | |

OTHER PUBLICATIONS

Search report from corresponding European 19924972.3 application, dated Nov. 28, 2022.
Office action from corresponding Brazilian BR 11 2021 018215 2 application dated Jan. 17, 2023.
PCT/CN2019/082904, International Search Report and Written Opinion with a mailing date of Jan. 15, 2020.
PCT/CN2019/082904, International Preliminary Report on Patentability with a mailing date of Oct. 28, 2021.

* cited by examiner

*Primary Examiner* — Anthony J Green
*Assistant Examiner* — Marites A Guino-O Uzzle
(74) *Attorney, Agent, or Firm* — Arthur R. Rogers

(57) ABSTRACT

A freeze-thaw stabilizer additive composition including (a) at least one anti-freezing agent; and (b) at least one emulsifier; and (c) any other desired optional compound; a process for making the above freeze-thaw stabilizer additive composition, a paint formulation made containing the above freeze-thaw stabilizer additive composition; and a process for making the above paint formulation.

11 Claims, 1 Drawing Sheet

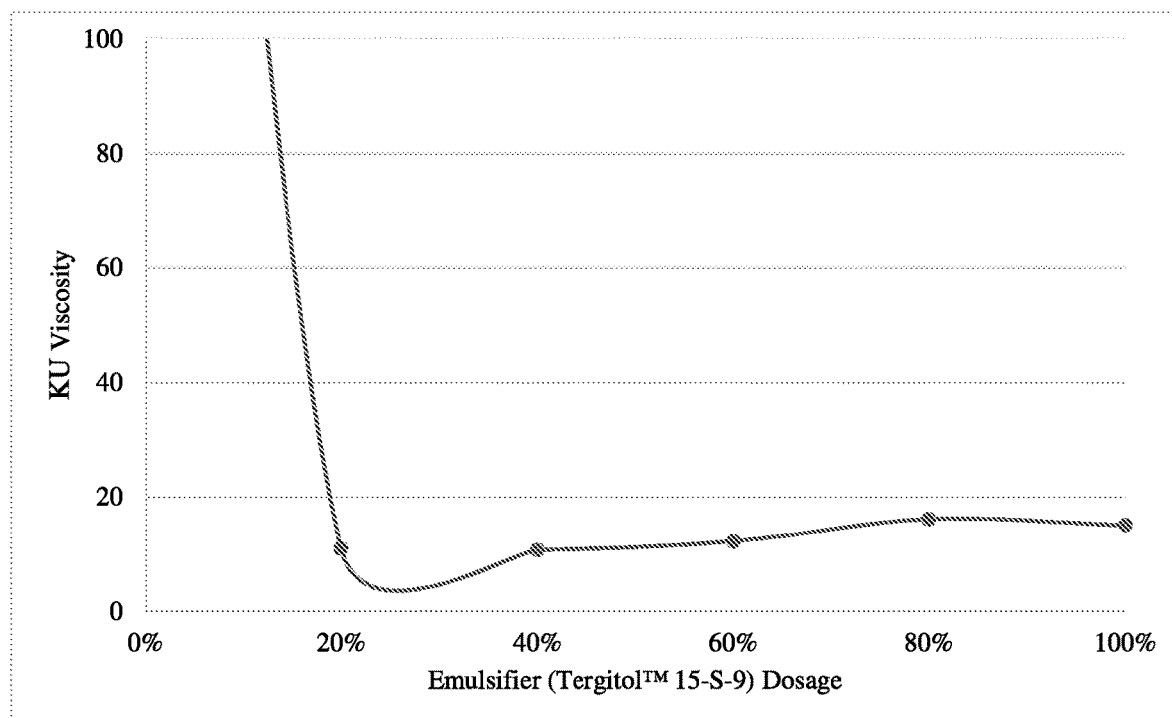

FREEZE THAW ADDITIVE COMPOSITION

FIELD

The present invention relates to a freeze-thaw stabilizer additive composition useful for paint formulations.

BACKGROUND

Latex paint formulations, in general, are made up of very complex compositions, must have multiple acceptable properties; and must meet multiple performance criteria. Freeze-thaw (F-T) stability is one of the important properties latex paint formulations should exhibit to ensure good quality architectural paints. A F-T stable paint formulation can be frozen and thawed and still remain a smooth, workable material. To achieve a paint formulation having a proper F-T property, a F-T stabilizer additive is typically added into the paint formulation. Ethylene glycol (EG) and propylene glycol (PG) are the most widely accepted F-T stabilizers in the paint industry. EG and PG are easily dissolved in water and in paint formulations; and these compounds used as stabilizers in paint formulations are efficient in keeping paint formulations stable during freeze and thaw cycles at a low dosage. However, EG and PG have a strong volatility and are considered as one of the major sources of volatile organic compounds (VOC). As the pressure of governmental regulations to protect the environment increases, it is highly desirable to reduce the amount of VOC present in architectural paints. And, a high performance and eco-friendly F-T stabilizer for paint formulations is high in demand by paint customers.

As a non-VOC alternative to EG and PG stabilizers, tri-styryl phenol (TSP) ethoxylate surfactants are accepted in the paint industry. Although a TSP type of surfactant is currently classified as an "non-alkylphenol ethoxylate (non-APE) based" additive or "alkylphenol ethoxylate-free" (APE-free) additive, the TSP type of surfactant perhaps might be considered an APE (alkylphenol ethoxylate) additive by some skilled in the art because of the TSP surfactant's major structure being a tri-styryl phenol initiated ethoxylate. In term of the TSP type surfactant's performance, however, a TSP type surfactant used as a F-T additive is considered less performing by the paint industry for use in middle-end paint formulations having a high (e.g., greater than [>] 50 percent [%]) pigment volume concentration [PVC] content. At the same time, some paint customers and formulators have complained that, not only the TSP type products cost higher than other stabilizer products, the use of TSP ethoxylates have had a negative impact on paint performance such as performance related to scrub resistance. Therefore, it is highly desirable to provide an environmentally friendly (non-VOC, non-APE based) F-T stabilizer composition for use in waterborne paint formulations wherein the F-T stabilizer composition has a comparable or increased F-T performance when compared to previously known PG and TSP ethoxylate surfactants; and wherein the F-T stabilizer composition provides improvements to other paint properties such as scrub resistance.

Heretofore, attempts have been made to improve the F-T performance of paint formulations using various surfactant compositions. For example, U.S. Pat. No. 8,993,658 B2 discloses surfactant compositions and the use of such surfactant compositions for aqueous compositions, in which it teaches that ArO—[$CH_2CH$—($CH_2CH_3$)]1-10($CH_2CH_2O$) 5-50H improves the F-T stability in an aqueous paint composition. However, the above patent does not provide other improvements to aqueous paint compositions while simultaneously increasing the F-T stability of the aqueous paint composition.

In addition to improvements in the F-T performance of compositions, there have been attempts to lower the content of VOC in compositions using various components. For example, U.S. Pat. No. 8,119,717 B2 discloses a coating composition used as protection or decoration by the construction industry. The coating includes a latex component, and an agent that replaces a volatile coalescing solvent, such that the resultant coating composition has a low VOC content (e.g., a molecular weight [Mw] of 132 grams per mole [g/mol] or more). The composition includes (1) a C10-Guerbet alcohol alkoxylate used as a low VOC coalescent agent component and (2) poly ethylene glycol (PEG) or poly propylene glycol (PPG) used as a freeze-thaw additive. However, the paint formulation taught in the above patent is complex and requires multiple ingredients to achieve the described benefits to the paint formulation.

Although some paint formulations may contain ingredients that may be used as F-T additives, it would be desirous in the paint industry to provide a blend of specific surfactants and specific anti-freezing compounds to improve the F-T performance of a paint formulation.

SUMMARY

The problems of the prior art are solved by the present invention directed to a F-T stabilizer additive composition useful for paint formulations wherein the F-T stabilizer additive composition comprises a mixture of a specific anti-freezing compound and a specific emulsifier. In some embodiments, such mixture provides a synergistic effect related to the viscosity change of a paint formulation. Surprisingly, the synergistic effect occurs when using a predetermined mixing ratio of the specific anti-freezing compound and the specific emulsifier to improve the F-T performance of paint formulations containing the F-T stabilizer additive composition.

The novel F-T stabilizer additive composition of the present invention demonstrates several benefits in various embodiments including, for example, a good F-T stabilizing effect in paint formulations made from different types of resin systems, while the composition displays a non-VOC and non-APE based benefit. The performance evaluation of the composition in paint formulations also indicates an improved scrub resistance compared to a conventional TSP type product in some embodiments. Moreover, F-T additive compositions of the present invention can be easily produced, for example by a simple mixing step without resorting to conventional complex synthesis routes.

In one embodiment, the present invention provides a F-T stabilizer additive composition including, for example, (a) at least an anti-freezing compound such as glycerin alkoxylate, pentaerythritol alkoxylate, sorbitol alkoxylate, and the like; and (b) at least an emulsifier such as C12-C14 primary or secondary ethoxylates, ethylene oxide (EO)/propylene oxide (PO) block copolymer, castor oil ethoxylate, iso-octanol alkoxylate, iso-decanol alkoxylate, and the like; and (c) any optional compounds as desired.

In another embodiment, the present invention provides a process for making the above F-T stabilizer additive composition.

In still another embodiment, the present invention provides a paint formulation including, for example, (A) a resin system; and (B) the above F-T stabilizer additive composition, and (C) any desired optional compounds.

In yet another embodiment, the present invention provides a process for making the above paint formulation.

BRIEF DESCRIPTION OF THE DRAWINGS

FIG. 1 is a graphical illustration showing the viscosity change (KU Viscosity) of a paint formulation after F-T tests are performed on the formulation versus the dosage of F-T additive composition (as a ratio of an anti-freezing compound and an emulsifier) in the formulation.

DETAILED DESCRIPTION

"Freeze-thaw stability", with reference to a formulation, herein means stability after a certain number of cycles of a freeze and thaw process as determined using the freeze-thaw stability test described in GB/T-9168-2008.

An "anti-freezing compound" herein means an additive that can lower the freezing point of water.

In a broad embodiment, the present invention is directed to a freeze-thaw (F-T) stabilizer additive composition useful in water-borne paint formulations. The F-T stabilizer additive composition of the present invention includes: (a) at least one anti-freezing compound; and (b) at least one alkoxylated emulsifier. Optional compounds can also be added to the freeze-thaw (F-T) stabilizer additive composition if desired.

The F-T additive composition of the present invention can include one or more anti-freezing compounds. For example, in one embodiment, the anti-freezing compound can include one or more alkoxylated anti-freezing compounds that one or more of the following including all combinations thereof: (1) have a functionality of greater than or equal to (≥) 2 functionalities, such as multi OH groups, including, for example, alkoxylates initiated with glycerin, pentaerythritol, and sorbitol; and mixtures thereof; (2) are derived from a starting alkylene oxide compound such as, ethylene oxide, propylene oxide, butylene oxide and mixtures thereof; (3) are soluble in water with a cloud point greater than (>) 20° C. at 1 wt % aqueous solution; (4) have a Mw of less than (<) 1,000 in one embodiment, <700 in another embodiment, and <500 in still another embodiment; (5) are low-VOC or non-VOC compounds; and (6) have a boiling point of >250° C. in one embodiment, and >287° C. in another embodiment.

In one embodiment, the anti-freezing additive compound comprises at least one of glycerin alkoxylate, pentaerythritol alkoxylate, sorbitol alkoxylate, and mixtures thereof. The anti-freezing compound can include, for example, commercially available compounds such as VORANOL™CP 300, DOWFAX™DF 121, VORANOL™RN482 (available from The Dow Chemical Company); Polyol 4640 (available from Perstorp), and mixtures thereof.

The amount of anti-freezing compound used to prepare the composition of the present invention includes, for example, from 1 wt % to 99 wt % in one embodiment, from 10 wt % to 90 wt % in another embodiment and from 20 wt % to 80 wt % in still another embodiment, based on the total weight of the F-T additive composition.

Some of the advantageous properties exhibited by the anti-freezing compound include, for example, (1) the compound is a non-VOC compound, and (2) the compound is low foaming. For example, one of the advantages of using the anti-freezing additive compound is that the anti-freezing additive compound is non-VOC. By "non-VOC" herein it is meant that the VOC content of the additive includes from 0 wt % to less than 1 wt % in one embodiment, from 0 to 0.05 wt % in another embodiment, and from 0 wt % to 0.001 wt % in still another embodiment. The VOC property of the anti-freezing additive compound is measured by gas chromatography according to GB 18582.

Another advantage of using the anti-freezing additive compound is that the anti-freezing additive compound is low foaming. By "low foaming" herein it is meant that the foaming of the additive is zero or at least maintained at a minute level as determine by visual observation of the foaming compared to conventional anti-freezing additive compounds.

The F-T additive composition of the present invention can include one or more alkoxylated emulsifiers. For example, in one embodiment, the alkoxylated emulsifier can include one or more alkoxylated emulsifiers prepared by reacting (bi) an initiator and (bii) an alkylene oxide. The initiator component (bi) includes, for example, a C4-C18 linear or branched alcohol, acid, ester, amine and mixtures thereof. Exemplary of the initiator can include a C12-C14 primary and secondary alcohol, castor oil, iso-octanol, iso-decanol, and mixtures thereof. Exemplary of the alkylene oxide, component (bii), can include ethylene oxide, propylene oxide, butylene oxide and mixtures thereof.

In another embodiment, the alkoxylated emulsifier includes a derivative of the alkoxylated emulsifier such as a phosphate ester, a sulfate, and mixtures thereof.

In one embodiment and not to be limited thereby, for example, the alkoxylated emulsifier, component (b), useful in the present invention is selected, for example, from one or more alkoxylated emulsifiers that: (1) has a number of alkylene oxide units of >1 in one embodiment, >3 in another embodiment, and >5 in still another embodiment; (2) has a middle Hydrophile-Lipophile Balance (HLB) value, for example, in the range of from 8 to 18 in one embodiment, from 8 to 15 in another embodiment; and from 10 to 15 in still another embodiment; (3) is dispersible or soluble in water; and (4) when a non-APE based composition is used, the use of an alkyl phenol group for the initiator, component (bi), should be avoided.

In one preferred embodiment, the emulsifier includes a C12-C14 primary or secondary alkoxylate, castor oil ethoxylate, and EO/PO block copolymer, and mixtures thereof. The emulsifier also includes, for example, commercially available compounds such as TERGITOL™15-S, ECOSURF™LF, TERGITOL™L TERGITOL™X (available from The Dow Chemical Company); and mixtures thereof.

The amount of the emulsifier used to prepare the F-T stabilizer additive composition of the present invention includes, for example, from 1 wt % to 99 wt % in one embodiment, from 20 wt % to 90 wt % in another embodiment and from 20 wt % to 80 wt % in still another embodiment, each based on the total weight of the F-T stabilizer additive composition.

In one preferred embodiment, when the freeze-thaw (F-T) stabilizer additive composition is prepared and used in a water-borne paint formulation, the mixing ratio of component (a) to component (b) is from 9/1 to 1/9 by weight in one embodiment, from 8/2 to 2/8 by weight in another embodiment, and from 8/2 to 4/6 by weight in still another embodiment. In the above ranges, the F-T stabilizer additive composition provides a synergistic F-T stabilizing effect to water-borne paint formulations in which the additive composition is used.

A "synergistic F-T stabilizing effect", with reference to a paint formulation, herein means that the F-T stabilizer additive composition does not substantially or significantly affect the viscosity of paint formulations. By "significantly affect the viscosity", with reference to a paint formulation, herein means that the use of a F-T stabilizer additive composition, when added to a paint formulation, does not increase or decrease the viscosity of the paint formulation. Or, at least any change in the viscosity of the paint formulation by using the F-T stabilizer additive composition is kept to a minimum. It has been found that the use of an anti-freezing additive compound, component (a), alone, in a paint formulation results in a paint formulation with a substantially higher viscosity than the combined anti-freezing additive compound, component (a), and emulsifier, component (b). In this instance, an anti-freezing additive compound used alone provides a paint formulation with a viscosity that prevents the formulation from being flowable and easily handled. It has also been found that the use of an emulsifier, component (b), alone, in a paint formulation results in a paint formulation with a slightly higher or the same viscosity than the combined anti-freezing additive compound, component (a), and emulsifier, component (b). Thus, the synergistic F-T stabilizing effect of the F-T stabilizer additive composition of the present invention includes maintaining a change in viscosity, either an increase or decrease, of a paint formulation to zero or to a minimum. For example, the change in viscosity of a paint formulation prior to and after addition of the F-T stabilizer additive composition of the present invention is less than 20% in one embodiment, from 0% to 20% in another embodiment, from 0% to 10% in still another embodiment, and from 0% to 5% in yet another embodiment. The viscosity property of the paint formulation is measured in Krebs units (KU) using a KU viscosity meter such as a Stormer viscometer.

In addition to the F-T additive compound, component (a), and the alkoxylated emulsifier, component (b), described above, the freeze-thaw (F-T) stabilizer additive composition of the present invention may also include other additional optional compounds or additives; and such optional compounds may be added to the composition with the F-T additive compound or the emulsifier. The optional additives or agents that can be used to prepare the freeze-thaw (F-T) stabilizer additive composition of the present invention can include one or more optional compounds known in the art for their use or function. For example, the optional additives, agents, or components useful in making the F-T stabilizer additive composition of the present invention can include wetting agents, dispersants, foam control agents, rheology modifiers, biocides, pH neutralizers, water, and the like; and mixtures thereof. The amount of optional compound used to prepare the composition of the present invention includes, for example, from 0 wt % to 50 wt % in one embodiment, from 0.01 wt % to 30 wt % in another embodiment and from 1 wt % to 10 wt % in still another embodiment.

In a general embodiment, the process for making the freeze-thaw (F-T) stabilizer additive composition of the present invention includes the step of admixing: (a) at least one anti-freezing additive compound; (b) at least one alkoxylated emulsifier; and (c) any optional compounds desired.

In a preferred embodiment, the freeze-thaw (F-T) stabilizer additive composition of the present invention is prepared, for example, by the steps: of (i) weighing a predetermined amount of components (a) and (b) and charging the components into a vessel to form a mixture; and
(ii) stirring the mixture in the vessel under mechanical stirring at a mixing rate of from 200 revolutions per minute (rpm) to 1,000 rpm, in one embodiment, for a time period of from 20 minutes (min) to 2 hours (hr) in one embodiment.

There are several advantageous properties exhibited by various embodiments of the F-T additive composition, once the composition is made. For example, (1) the F-T additive composition can exhibit excellent Freeze-Thaw stability (2) the F-T additive composition exhibits good scrub resistance, (3) the F-T additive composition is non-VOC, (4) the F-T additive composition is non-APE based, and (5) the F-T additive composition has a wide compatibility to various resins.

For example, one of the properties of the F-T additive composition is providing a paint formulation with a freeze-thaw stability of from 0.5 wt % to 1.5 wt % in one embodiment; and from 0.5 wt % to 1 wt % in another embodiment. The stability property of the paint formulation is measured by particle size measurement or by visual observation with a naked eye.

For example, another property of the F-T additive composition is to provide a paint with good scrub resistance. The good scrub resistance means F-T additive compound does not reduce scrub resistance of the paint film compared to traditional PG or EG as F-T additive, or at least is maintained to a minimum reduction in scrub resistance. The scrub resistance includes, for example, from 60% to 120% of that with PG as F-T additive in one embodiment; from 80% to 120% in another embodiment, and from 90% to 110% in still another embodiment. The scrub resistance property of the paint formulation is measured by the number of cycles that paint film samples go through before the paint film sample are scrubbed through the thickness of the film sample according to the procedure described in ASTM D2486-74A.

Another advantageous property of the F-T additive composition includes, for example, the F-T additive composition being a non-VOC composition. By "non-VOC" herein it is meant that the VOC content of the F-T additive composition includes less than 1 wt % in one embodiment, from 0 wt % to 0.05 wt % in another embodiment, and from 0 wt % to 0.001 wt % in still another embodiment. The VOC property of the F-T additive composition is measured by gas chromatography according to GB 18582.

Still another advantageous property of the F-T additive composition includes, for example, the F-T additive composition being a non-APE-based composition. By "non-APE-based" or "APE-free" herein it is meant that the alkylphenol ethoxylate content of the composition includes less than 0.1 wt % in one embodiment, from 0 wt % to less than 0.1 wt % in another embodiment, from 0 wt % to 0.01 wt % in still another embodiment, and from
0 wt % to 0.0005 wt % in yet another embodiment. The alkylphenol ethoxylate content of the composition is measured by High Performance Liquid chromatography (HPLC).

Also, the F-T additive composition beneficially has a wide compatibility to various resins such as styrene acrylic (SA) resins, pure or all acrylic (AA) resins, vinyl acrylic (VA) resins, ethylene-vinyl acetate (EVA) binder, and mixtures thereof. By "compatibility" herein it is meant that the F-T additive composition of the present invention works effectively in the above described different types of resins compared to a conventional TSP type F-T additive which can only work with a SA resin; and is not suitable for other resins, such as a VA resin.

The components that make up a paint composition or formulation are well known in the art of making paints and typically include a resin polymer and additives such as water, dispersants, wetting agents, anti-foam agents, thickeners, rheology modifiers, pH buffers, pH neutralizers, biocides, pigments, fillers, coalescents, and the like; and mixtures thereof. The F-T stabilizer additive composition of the present invention is useful as another additive for paint formulations. In one preferred embodiment, the F-T stabilizer additive composition is useful, for example, in waterborne paint formulations.

In one general embodiment, the paint formulation includes, for example, (A) a resin system; and (B) the freeze-thaw stabilizer additive composition described above; and (C) any other desired optional additive compounds as described above. In a preferred embodiment, the resin system, component (A), of the paint formulation includes, for example, at least one binder. The binder is useful for coating film formation with paint formulation compositions. For example, the binder is selected from the group consisting of a pure or all acrylic (AA) polymer, a styrene-acrylic (SA) polymer, a vinyl acrylic (VA) polymer, a vinyl acetate-acrylic polymer, an ethylene-vinyl acetate (EVA) polymer, and the like; and mixtures thereof.

The concentration of the binder in the paint formulation is, for example, from 5 wt % to 60 wt % in one embodiment, from 10 wt % to 60 wt % in another embodiment, and from 10 wt % to 40 wt % in still another embodiment.

Because the F-T additive composition is a non-VOC composition as described above, advantageously, the paint formulation of the present invention has no volatile organic compounds present in the formulation; or at least only a minute amount of VOC is present in the formulation due to unintentional contamination. Generally, the concentration of VOCs in the formulation is, for example, lower than 150 grams per liter (g/L) in one embodiment, lower than 50 g/L in another embodiment, and lower than 5 g/L in still another embodiment. In other embodiments, the VOC content of the formulation includes, for example, from 0.01 g/L to less than 150 g/L in one embodiment, from 0.01 g/L to less than 50 g/L in another embodiment, and from 0.01 g/L to less than 5 g/L in still another embodiment.

In general, the paint formulation includes a waterborne paint formulation. In one embodiment, the waterborne paint formulation includes an exterior architectural paint. In another embodiment, the waterborne paint formulation includes an interior architectural paint.

As aforementioned, once the F-T stabilizer additive composition of the present invention is made, the F-T stabilizer additive composition is added, for example, to a paint formulation for preparing a F-T stabilized paint product. In a broad embodiment, the process for making a paint formulation includes, for example, admixing (A) the resin system described above; (B) the freeze-thaw stabilizer additive composition described above; and (C) any optional compounds desired. Conventional mixing methods used in the paint industry are also useful herein to prepare the paint formulation; and the mixing of the components of the formulation is carried out, for example, at a temperature of from 20 degrees Celsius (° C.) to 30° C. in one general embodiment.

The paint formulation containing the F-T stabilizer additive composition exhibits several beneficial properties, including for example: (1) the paint formulation has an improved F-T stability; (2) the paint formulation has an increased scrub resistance; (3) the paint formulation is a non-VOC alternative; and (4) the paint formulation is a non-APE based alternative.

For example, one of the properties of the paint formulation includes, for example, that the paint formulation has a freeze-thaw stability of from −5° C. to room temperature (20° C.) in one embodiment; from −10° C. to room temperature (20° C.) in another embodiment, and from −18° C. to room temperature (20° C.) in still another embodiment. The stability property of the paint formulation and its viscosity is measured according to the test procedure described in GB/T-9168-2008. In addition to the above test to measure stability, the paint formulation can be analyzed by its appearance to the naked eye to observe any particles that may form undesired aggregation, sedimentation or caking to confirm the stability property of the paint formulation.

Another property of the paint formulation includes, for example, the paint formulation having a non-VOC or low VOC concentration making the formulation an eco-friendly formulation. For example, the VOC concentration of the paint formulation, if present, can be <150 g/L; in one embodiment, <50 g/L in another embodiment, and <5 g/L in still another embodiment. The VOC property of the paint formulation is measured by gas chromatography according to GB 18582.

Still another property of the paint formulation includes, for example, the paint formulation exhibiting an increase in scrub resistance. For example, the scrub resistance includes from 60% to 120% of control sample with PG as F-T additive in one embodiment; from 80% to 120% in another embodiment, and from 90% to 110% in still another embodiment. The scrub resistance property of the paint formulation is measured by cycles that films are scrub through according to the procedure described in ASTM D 2486-74A.

The F-T additive composition is useful, for example, in waterborne paint formulations. Advantageously, a low VOC waterborne paint formulation is produced using the above described F-T stabilizer, component (a). The low VOC waterborne paint with the described F-T stabilizer, component (a), is useful, for example, in exterior architectural paints and/or in interior architectural paints.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) which follow are explained hereinbelow:

"PVC" stands for Pigment Volume Concentration.

Various ingredients, components, or raw materials used in preparing the F-T additive composition of the present invention are explained in Table I.

TABLE I

| Freeze-Thaw Additive Raw Materials | | | | |
|---|---|---|---|---|
| Raw Material | Chemical Structure | Function | Technical Parameter | Supplier |
| PG | Propylene glycol | | Comparative example | The Dow Chemical Company (DOW) |
| FT-100 | Tristyrylphenol derivative | | Comparative example | Solvay |
| Voranol ™ CP300 | Glycerin-PO | Antifreeze compound | Theoretical Mw = 300, soluble in water, 3 functionality. | DOW |

TABLE I-continued

Freeze-Thaw Additive Raw Materials

| Raw Material | Chemical Structure | Function | Technical Parameter | Supplier |
|---|---|---|---|---|
| Tergitol™ 15-S-9 | C12-14 secondary alcohol ethoxylate | Emulsifier | HLB = 13.3; soluble in water at 1% aqueous (aq.) solution; non-APEO based | DOW |
| Ecosurf™ LF-45 | C12-14 secondary alcohol alkoxylate | Emulsifier | HLB = 12; soluble in water at 1% aq. solution; non-APEO based | DOW |
| Tergitol™ L-64 | EO-PO-EO | Emulsifier | HLB = 15; soluble in water at 1% aq. solution; non-APEO based | DOW |

Examples 1-6 and Comparative Examples A-E—Freeze-Thaw Additive

The F-T additive composition samples of Inv. Ex. 1-6 and Comp. Ex. E were prepared by simply mixing the two ingredients specified in Table II under mechanical stirring. The composition samples are described in Table II.

TABLE II

Compositions of Freeze-Thaw Additive Samples

| Component | Inv. Ex. 1 | Inv. Ex. 2 | Inv. Ex. 3 | Inv. Ex. 4 | Inv. Ex. 5 | Inv. Ex. 6 | Comp. Ex. A | Comp. Ex. B | Comp. Ex. C | Comp. Ex. D | Comp. Ex. E |
|---|---|---|---|---|---|---|---|---|---|---|---|
| Voranol™ CP300 | 80% | 60% | 40% | 20% | 50% | 50% | 100% | | | | 50% |
| Tergitol™ 15-S-9 | 20% | 40% | 60% | 80% | 50% | | | 100% | | | |
| Ecosurf™ LF-45 | | | | | | 50% | | | | | |
| Tergitol™ L-64 | | | | | | | | | | | 50% |
| FT-100 | | | | | | | | | 100% | | |
| PG | | | | | | | | | | 100% | |

Various ingredients, components, or raw materials used in preparing the paint formulations containing the F-T additive composition of the present invention are explained in Table III.

TABLE III

| Material | Paint Materials Function | Supplier |
|---|---|---|
| OROTAN™ 963 | Dispersant | The Dow Chemical Company (DOW) |
| ECOSURF™ EH-9 | Wetting agent | DOW |
| BYK® 024 | Anti-foam agent | BYK Additives & Instruments (BYK) |
| Natrosol® 250HBR (HEC) | Thickener | Ashland Global Specialty Chemicals Inc. (Ashland) |
| AMP® 95 | pH buffer | Golden Gate Capital |
| OROTAN™ CA-2500 | Dispersant | DOW |
| ROCIMA™ 363 | Biocide | DOW |
| Titanium dioxide | Pigment | E. I. du Pont de Nemours and Company (DuPont) |
| CaCO₃, 700 m Huashi, 1,250 m | Filler Filler | |
| Kaolin, 1,250 m | Filler | |
| PRIMAL™ DC-420 Emulsion | Binder | DOW |
| ROPAQUE™ ULTRA E | Polymer | DOW |
| UCAR™ Filmer IBT | Coalescent | DOW |
| KATHON™ LXE | Biocide | DOW |
| BYK® 024 | Anti-foam agent | BYK |
| ACRYSOL™ RM-845 | Thickener | DOW |
| ACRYSOL™ DR-7700 | Thickener | DOW |

General Process for Preparing Paint Formulations

The following general process was used to prepare paint formulations containing the F-T additive composition of the present invention (referred to herein as "F-T Stabilizer"):

Part A: Grinding Procedure

Step (1): A dispersing plate was installed on the dispersing machine.

Step (2): Water was added into a 1 liter (L) stainless steel cup.

Step (3): A thickening agent and pH buffer were added into the steel cup and the contents in the steel cup were continually dispersed at 450 rpm for 10 min. The resultant mixture became thick gradually.

Step (4): A dispersant and wetting agent were respectively added to the mixture in the steel cup and the contents in the steel cup were continually dispersed for 10 min.

Step (5): Titanium dioxide and fillers were added to the mixture in the steel cup while the dispersing speed was raised to 1,800 rpm gradually as the viscosity of the mixture in the steel cup increased.

Step (6): The resultant mixture from step (5) was continuously dispersed for 30 min more to guarantee the homogeneity of the resulting final mixture.

Part B: Letdown Procedure

Step (7): The dispersion plate was changed to a stirrer, and the resultant mixture from step (6) was continuously stirred at 1,800 rpm with the stirrer.

Step (8): A binder, anti-foam agent, coalescent and biocide were respectively added to the resultant mixture from step (7). The stirring speed of the stirrer was slowed down to 700-800 rpm gradually as the viscosity of the mixture decreased, and then the mixture was continuously stirred at 700-800 rpm for 10 min.

Step (9): A thickening agent was added to the mixture from step (8) and the stirring speed was increased up to 1,800 rpm as the viscosity of the mixture increased; and the mixture was continuously stirred for 10 min. The viscosity, reported in Krebs units (KU), of the resultant mixture which was a paint formulation was adjusted using a thickening agent. The KU viscosity was adjusted in the range of from 95 KU to 100 KU. The viscosity is reported in KU as measured using a conventional Stormer viscometer. As is well known, a Stormer viscometer uses load-based rotation in order to determine viscosity.

Part C: Adding the F-T Stabilizer

Step (10): The paint formulation from step (9) was divided into several parts.

Step (11): Each part of the paint formulation was continuously stirred at 700-800 rpm, and then the F-T stabilizer was added to the formulation (according to the particular formulation being tested as described in Table II) while the formulation was continuously stirred for 10 min.

Step (12): Each paint formulation sample from the formulation of step (11) to be tested was kept in a laboratory on a laboratory countertop at room temperature (about 23° C.) for at least 24 hr before subjecting the sample to F-T testing.

Examples 7-9—Paint Formulations

Three paint formulations were prepared using the above General Procedure and the paint formulations were tested and evaluated as described herein below. The three paint formulations are described in Table IV and include: (1) a middle-end architectural paint with SA binder (59% PVC); (2) an interior architectural paint with AA binder (52% PVC); and (3) a middle-end exterior architectural paint with AA binder (55.6% PVC). The PVC used in the formulations was applied in the range from 50% to 70%; the three formulations cover both interior and exterior architectural paints; and SA and AA type of binder was used in the formulations.

TABLE IV

Paint Formulations

| Raw Material | Inv. Ex. 7 Middle-End Architectural Paint with SA Binder (59% PVC) Weight (g) | Inv. Ex. 8 Interior Architectural Paint with AA Binder (52% PVC) Weight (g) | Inv. Ex. 9 Middle-End Exterior Architectural Paint with AA Binder (55.6% PVC) Weight (g) |
| --- | --- | --- | --- |
| Grinding | | | |
| water | 146 | 165.0 | 150.0 |
| F-T stabilizer | 10.0 | 10.0 | 10.0 |
| OROTAN ™ 963 | 5 | — | — |
| ECOSURF ™ EH-9 | 2 | 1.5 | 1.5 |
| BYK ® 024 | 1 | 1.0 | 1.0 |
| Natrosol ® 250HBR (HEC) | 2 | 1.5 | 2.0 |
| AMP ® 95 | 2 | 1.5 | 2.0 |
| OROTAN ™ CA-2500 | 6 | 7.5 | 3.0 |
| OROTAN ™ 963 | — | — | 5.5 |
| ROCIMA ™ 363 | 2 | — | 5.0 |
| ROCIMA ™ CF1000 | — | 2.5 | — |
| Titanium dioxide | 120 | 200.0 | 150.0 |
| CaCO$_3$, 700 m | 130 | 50.0 | — |
| CaCO$_3$, 800 m | — | — | 230 |
| Huashi, 1250 m | 40 | — | — |
| Matting powder | — | 35.0 | — |
| Kaolin, 1250 m | 80 | 35.0 | — |

TABLE IV-continued

Paint Formulations

| Raw Material | Inv. Ex. 7 Middle-End Architectural Paint with SA Binder (59% PVC) Weight (g) | Inv. Ex. 8 Interior Architectural Paint with AA Binder (52% PVC) Weight (g) | Inv. Ex. 9 Middle-End Exterior Architectural Paint with AA Binder (55.6% PVC) Weight (g) |
| --- | --- | --- | --- |
| Letdown | | | |
| PRIMAL ™ DC-420 Emulsion | 250 | — | — |
| PRIMAL ™ AC-261C Emulsion | — | — | 260.0 |
| PRIMAL ™ AC-268 Emulsion | — | 280.0 | — |
| ROPAQUE ™ ULTRA E | 60 | 70.0 | 50.0 |
| UCAR ™ Filmer IBT | 25 | 15.0 | 14.0 |
| KATHON ™ LXE | 2 | 2.0 | — |
| BYK ® 024 | 2 | 1.0 | 2.0 |
| ACRYSOL ™ RM-845 | 1.5 | — | 1.5 |
| ACRYSOL ™ DR-7700 | 3 | 5.0 | 1.0 |
| ACRYSOL ™ TT-935 | — | 3.5 | — |
| AMP-95 | — | 0.5 | — |
| ACRYSOL ™ RM-2020NPR | — | 10.0 | — |
| water | 105.5 | 102.5 | 111.5 |
| Total | 1,000 | 1000 | 1000 |

Performance Evaluation Tests

Freeze-Thaw Stability Test (GB/T-9168-2008)

A paint formulation sample was placed into a freezer at a temperature of −5±2° C. and allowed to freeze for 18 hr. Then, the paint sample was removed from the freezer and placed under room temperature (about 23° C.) for 6 hr. The freeze-thaw (F-T) process was repeated for each paint sample for 3 cycles, and the appearance of the formulation was checked visually for any of the phenomena: settling, gelation, coagulation, or aggregation. If no phenomena described above in the formulation were visually observed, the freeze-thaw stability of the formulation was qualified.

The KU viscosity of the paint formulation was tested before and after the above F-T tests as an indication of the F-T performance. The lower the KU viscosity change is, the better the F-T performance of the formulation.

Scrub Resistance Test (ASTM Test Method D 2486-74A)

The general procedure for testing the paint formulation samples was as follows:

Step (1): Make a drawdown of paint with 150 microns (μm) film applicator on a black vinyl scrub chart.

Step (2): Allow the black vinyl scrub chart to dry at current temperature room (CTR) for 7 days.

Step (3): Place the black vinyl scrub chart on a scrub machine and use an abrasive scrub medium, e.g., Type SC-2, to test the chart.

Step (4): Start the scrub resistance test and record the first cut-through cycles.

Performance Evaluation Results

Experiment 1— Paint Formulation with SA Binder (59% PVC)

(a) Viscosity

The total dosage of the freeze-thaw additive samples was kept at 1 wt % in each test. Delta KU, that is, the resulting KU after the F-T test minus the intial KU, is used herein as a measure of F-T performance of a freeze-thaw additive sample. The smaller the Delta KU, the better the F-T stabilizing performance.

From the test results shown in Table V and FIG. 1, it can be seen that anti-freeze compound, CP300, alone (Comp. Ex. A) showed poor F-T stabilizing performance. After 3 cycles of F-T test, paint sample showed solidified appearance without fluidity even under agitation. When the anti-freeze compound, CP300, was mixed with an emulsifier, 15-S-9, (Inv. Ex. 1-4), the F-T performance was much improved with better fluidity and less aggregates. Compared to anti-freeze compound, CP300, alone (Comp. Ex. A) and emulsifier, 15-S-9, alone (Comp. Ex. B), the blends of the two components showed smaller Delta KU. A synergistic effect was found in the mixing ratio of CP300/15-S-9 from 8/2 to 4/6 by weight. In contrast, in Comp. Ex. E, emulsifier, L-64, was mixed with the anti-freeze compound, CP300; and a poor F-T performance was found.

TABLE V

KU Viscosity Change After Freeze-Thaw Tests (Wt %)

| Component DC-420/59 % PVC | Comp. Ex. A | Inv. Ex. 1 | Inv. Ex. 2 | Inv. Ex. 3 | Inv. Ex. 4 | Comp. Ex. B | Comp. Ex. C | Comp. Ex. E |
|---|---|---|---|---|---|---|---|---|
| Voranol™ CP300 | 1% | 0.8% | 0.6% | 0.4% | 0.2% | | | 0.5% |
| Tergitol™ 15-S-9 | | 0.2% | 0.4% | 0.6% | 0.8% | 1% | | |
| Tergitol™ L-64 | | | | | | | | 0.5% |
| FT-100 | | | | | | | 1% | |
| Initial KU | 99.0 | 91.3 | 86.1 | 84.5 | 79.0 | 76.6 | 89.8 | Solidification, failed |
| KU after 3 F-T cycles | solidification | 102.3 | 96.8 | 96.7 | 95.1 | 91.6 | 108.5 | |
| Delta KU | Out of detection limit | 11.0 | 10.7 | 12.2 | 16.1 | 15 | 18.7 | |

(b) Scrub Resistance

Scrub resistance is an indication of densification and anti-pulverization of paint layers. As aforementioned, one-drawback of a TSP-type product is the negative influence on the scrub resistance property. Comp. Ex. D (using 1% PG) was used as the control in this scrub resistance test. As shown in Table VI, when Inv. Ex. 5 (CP-300/15-S-9) was used, the scrub resistance was maintained at a 91.7% of the PG performance. In contrast, the scrub resistance of Comp. Ex. B (15-S-9) was maintained at a 48.2% of the PG performance. Comp. Ex. B with emulsifier, 15-S-9, had a Delta KU viscosity higher than the Delta KU viscosity of Inv. Ex. 1 as shown in Table V; and the scrub resistance of Comp. Ex. B was almost twice as worse than the scrub resistance of Inv. Ex. 1 as shown in Table VI. The scrub resistance performance for Comp. Ex. C (FT-100) was at 51.9% which was also not good.

TABLE VI

Scrub Resistance Performance with Different F-T Additive Samples

| Component DC-420/59 % PVC | Inv. Ex. 5 | Comp. Ex. B | Comp. Ex. C | Comp. Ex. D |
|---|---|---|---|---|
| Voranol™ CP-300 | 0.5% | | | |
| Tergitol™ 15-S-9 | 0.5% | 1% | | |
| Ecosurf™ LF-45 | | | | |
| FT-100 | | | 1% | |
| PG | | | | 1% |
| Scrub resistance percentage* | 91.7% | 48.2% | 51.9% | 100% |

*"Scrub resistance percentage" = cut through cycles with tested additive sample/cut through cycles with PG.

Experiment 2— Interior Architectural Paint with AA Binder (52% PVC)

The Inventive Examples were evaluated in paint formulations containing an AA binder. As shown in Table VII, compared to Comp. Ex. B and Comp. Ex. C, the F-T additive compositions (Inv. Ex. 2 and 6) achieved a quite small Delta KU. At the same time, the scrub resistance performance of the F-T additive compositions (Inv. Ex. 2 and 6) was better than FT-100 (Comp. Ex. B).

TABLE VII

F-T Performance in Interior Architectural Paint with AA Binder

| Component AC-268/52% PVC | Inv. Ex. 2 | Inv. Ex. 6 | Comp. Ex. C | Comp. Ex. B |
|---|---|---|---|---|
| Voranol™ CP300 | 0.6% | 0.5% | | |
| Ecosurf™ LF-45 | | 0.5% | | |

TABLE VII-continued

F-T Performance in Interior Architectural Paint with AA Binder

| Component | Example No. | | | |
|---|---|---|---|---|
| AC-268/52% PVC | Inv. Ex. 2 | Inv. Ex. 6 | Comp. Ex. C | Comp. Ex. B |
| Tergitol ™ 15-S-9 | 0.4% | | | |
| PG | | | 1% | |
| FT-100 | | | | 1% |
| KU | 99.0 | 96.4 | 111.8 | 98.9 |
| Delta KU | 2.9 | −0.3 | 13.7 | 2.2 |
| Scrub Resistance percentage* | 92.3% | 94.8% | 100% | 75.2% |

*"Scrub resistance percentage" = cut through cycles with tested additive sample/cut through cycles with PG.

Experiment 3— Middle End Exterior Architectural Paint with AA Binder (55.6% PVC)

Tests were carried out on exterior paint with AA binder, as shown in Table VIII. Similar to the results of the other Experiments above, the Inv. Ex. 2 showed good F-T performance with a small Delta KU. In addition, the scrub resistance of Inv. Ex. 2 was better than both Comp. Ex. B and Comp. Ex. C.

TABLE VIII

F-T Performance in Exterior Architectural Paint with AA Binder

| Component | Example No. | | |
|---|---|---|---|
| | Inv. Ex. 2 | Comp. Ex. C | Comp. Ex. B |
| Voranol ™ CP300 | 0.6% | | |
| Tergitol ™ 15-S-9 | 0.4% | | |
| PG | | 1% | |
| FT-100 | | | 1% |
| KU | 90.9 | 103.1 | 96.3 |
| KU after 3 cycles | 93.4 | 104.2 | 99.7 |
| Delta KU | 2.5 | 1.1 | 3.4 |
| Scrub Resistance percentage | 103.7% | 100% | 80.5% |

From the tests performed as described above, several conclusions can be arrived at including for example: (1) the solution of the present invention can be easily obtained by simple mechanical mixing; (2) mixtures of anti-freeze compound and emulsifier that meet the aforementioned criteria mentioned above, can achieve effective performance to stabilize paint formulations during freeze-thaw cycles; (3) a synergistic effect can be achieved by using a specific mixing ratio for the components of the composition of the present invention; (4) a good EH&S profile can be achieved with non-VOC, non-APEO based properties; (5) a significant improvement in the scrub resistance performance can be obtained using the compositions of the present invention compared to a conventional TSP derivative; and (6) the solution can be compatible with different binders in waterborne architectural paint formulations.

What is claimed is:

1. A freeze-thaw stabilizer additive composition comprising (a) from 20 wt % to 80 wt %, based on the total weight of the freeze-thaw stabilizer additive composition, of at least one anti-freezing compound selected from the group consisting of glycerin alkoxylate, pentaerythritol alkoxylate, sorbitol alkoxylate, and mixtures thereof; and (b) from 20 wt % to 80 wt %, based on the total weight of the freeze-thaw stabilizer additive composition, of at least one emulsifier, wherein the at least one emulsifier comprises a C12 to C14 primary or secondary alkoxylate, castor oil ethoxylate, ethylene oxide/propylene oxide copolymer, butylene oxide, or a mixture thereof; wherein the freeze-thaw stabilizer additive composition provides a paint formulation having a stability such that the change in viscosity of the paint formulation is from 0 percent to less than 10 percent after the formulation is subjected to the Freeze-Thaw Stability Test described in GB/T-9168-2008, when the viscosity of the paint formulation is measured at 23° C. using a Stormer Viscometer before and after the Freeze-Thaw Stability Test.

2. The composition of claim 1, wherein the freeze-thaw stabilizer additive composition provides a paint formulation having an appearance lacking particle aggregation, sedimentation, or caking.

3. The composition of claim 1, wherein the freeze-thaw stabilizer additive composition provides a paint formulation having (i) a VOC level of from 0 weight percent to less than 1 weight percent; and (ii) an APE level of from 0 weight percent to less than 0.1 weight percent.

4. The composition of claim 1, wherein the freeze-thaw stabilizer additive composition provides a paint formulation having a scrub resistance of from 60 percent to 120 percent of that with a propylene glycol as measured according to the procedure described in ASTM D2486-74A.

5. A paint formulation comprising (A) a resin system; and (B) the freeze-thaw stabilizer additive composition of claim 1.

6. The paint formulation of claim 5, wherein the resin system, component (A), includes at least one binder selected from the group consisting of an acrylic polymer, a styrene-acrylic polymer, a vinyl acetate-acrylic polymer, an ethylene-vinyl acetate polymer, and mixtures thereof.

7. The paint formulation of claim 6, wherein the binder is present in a concentration of from 5 weight percent to 60 weight percent based on the total weight of the paint formulation.

8. The paint formulation of claim 5 comprising a waterborne paint formulation.

9. A process for making a paint formulation comprising admixing (A) a resin system; and (B) the freeze-thaw stabilizer additive composition of claim 1.

10. A process for making a freeze-thaw stabilizer additive composition comprising admixing (a) from 20 wt % to 80 wt %, based on the total weight of the freeze-thaw stabilizer additive composition, of at least one anti-freezing compound selected from the group consisting of glycerin alkoxylate, pentaerythritol alkoxylate, sorbitol alkoxylate, and mixtures thereof; and (b) from 20 wt % to 80 wt %, based on the total weight of the freeze-thaw stabilizer additive composition, of at least one emulsifier wherein the at least one emulsifier comprises a C12 to C14 primary or secondary alkoxylate, castor oil ethoxylate, ethylene oxide/propylene oxide copolymer, butylene oxide, or a mixture thereof.

11. A freeze-thaw stabilizer additive composition comprising (a) at least one anti-freezing compound selected from the group consisting of glycerin alkoxylate, pentaerythritol alkoxylate, sorbitol alkoxylate, and mixtures thereof; and (b) at least one emulsifier selected from the group consisting of a C12 to C14 primary or secondary alkoxylate, castor oil ethoxylate, ethylene oxide/propylene oxide copolymer, butylene oxide, or a mixture thereof.

* * * * *